US008291038B2

(12) United States Patent
Driesen (10) Patent No.: US 8,291,038 B2
(45) Date of Patent: Oct. 16, 2012

(54) REMOTE AUTOMATION OF MANUAL TASKS (75) Inventor: Volker Driesen, Walldorf (DE)

(73) Assignee: SAP AG, Walldorf (DE)

( * ) Notice: Subject to any disclaimer, the term of this patent is extended or adjusted under 35 U.S.C. 154(b) by 255 days.

(21) Appl. No.: 12/493,588

(22) Filed: Jun. 29, 2009

(65) Prior Publication Data

US 2010/0332585 A1  Dec. 30, 2010

(51) Int. Cl.
*G06F 15/16* (2006.01)
*G06F 7/00* (2006.01)
*G06Q 10/00* (2012.01)

(52) U.S. Cl. ........ 709/217; 709/203; 709/208; 705/301; 707/610; 707/623

(58) Field of Classification Search .................. 709/203, 709/208, 217; 707/610, 623; 705/301
See application file for complete search history.

(56) References Cited

U.S. PATENT DOCUMENTS

| 2005/0193002 | A1* | 9/2005 | Souders et al. ........... 707/103 X |
| 2006/0136351 | A1* | 6/2006 | Angrish et al. .................... 707/1 |
| 2007/0294298 | A1* | 12/2007 | Lemcke et al. ............ 707/104.1 |
| 2009/0307353 | A1* | 12/2009 | Felton et al. ................... 709/226 |

OTHER PUBLICATIONS

Teodor Zlatanov, "Cultured Perl: Automating UNIX System Administration with Perl," pp. 1-10 (Jul. 2001).

* cited by examiner

*Primary Examiner* — Larry Donaghue
*Assistant Examiner* — Jeong S Park
(74) *Attorney, Agent, or Firm* — Fish & Richardson P.C.

(57) ABSTRACT

Implementations of the present disclosure provide for automation of manual tasks executed on an application server. Implementations include generating a manual action request at the application server, the manual action request including at least one parameter, transmitting the manual action request to an administrator computer, determining that an automation module corresponding to the manual action request exists within a database based on the at least one parameter, providing the automation module to the application server, and executing the automation module on the application server to resolve a task corresponding to the manual action request.

21 Claims, 5 Drawing Sheets

REMOTE AUTOMATION OF MANUAL TASKS

BACKGROUND

In a number of organizations, separate functions are distributed amongst various different development teams, such as a hardware team, a software team, a mechanical team, a testing team, and a database team, as a few examples. This diversification enables personnel to specialize in different product aspects to create a deeper understanding and higher skill level within their respective teams. During a cross-functional activity, several teams will be involved such that a number of tasks have to be organized to be executed by different teams in an overlapped time period.

When performing activities in a cross-functional team, a number of administrative tasks and management members can be added to the team to ensure tasks are carried out in a timely fashion. This addition of tasks and members generally adds time to a team schedule, but also ensures the tasks are carried out appropriately throughout an organization.

SUMMARY

Implementations of present disclosure include methods of automating manual tasks executed on an application server. In some implementations, a method includes generating a manual action request at the application server, the manual action request including at least one parameter, transmitting the manual action request to an administrator computer, and determining that an automation module corresponding to the manual action request exists within a database based on the at least one parameter. The automation module is provided to the application server, and the automation module is executed on the application server to resolve a task corresponding to the manual action request.

In some implementations, the method further includes accessing automation rules stored in a rule database, and applying the automation rules to the manual action request to extract the at least one parameter. In such implementations, the method can further include providing the automation rules to at least one of an application server type, a tool type corresponding to a tool that is executed on the application server, and a procedure type corresponding to a procedure that can be executed on the application server.

In some implementations, the method further includes initiating a procedure by the administrator computer, and instantiating a tool on the application server, the tool being executable by the application server to execute the procedure. In such implementations, the method can further include accessing a procedure definition stored in a procedure database, the procedure definition identifying the tool.

In some implementations, the method further includes determining that an automation module corresponding to the manual action request does not exist within the database based on the at least one parameter, and updating a manual task list to include the task when determining that an automation module corresponding to the manual action request does not exist within the database.

In some implementations, the method further includes storing the automation module to an intermediate computer-readable storage medium, and accessing the automation module from the intermediate computer-readable storage medium for execution on the application server.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
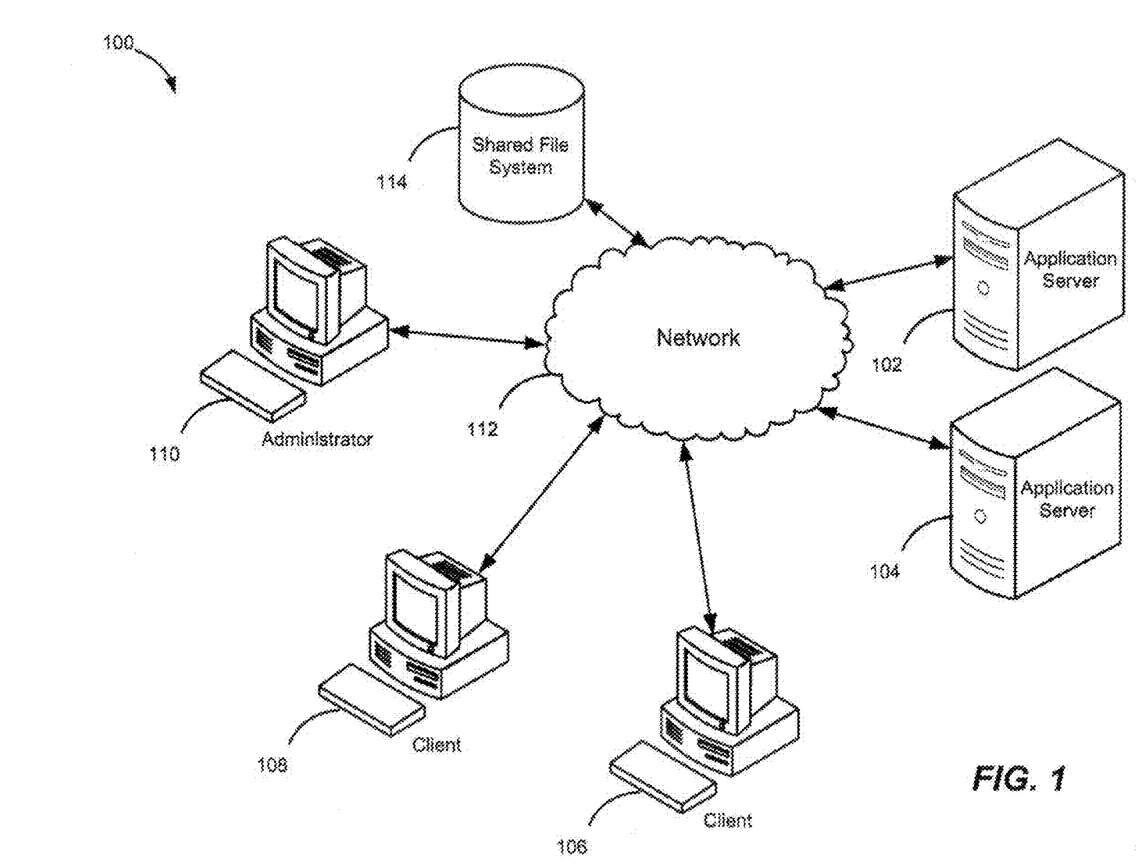
FIG. 1 is a schematic illustration of an exemplar lifecycle management architecture.

Referring now to FIG. 1, a schematic illustration of an exemplar lifecycle management architecture 100 is provided. The architecture 100 can manage the lifecycle of a tool, a product, a database, an application, a service, a system, or any combination of the above. As used herein, the term "lifecycle" refers to the stages of a product through its useful life in the market with respect to business costs, commercial costs and sales measures. Lifecycle management corresponds to artifacts, components, descriptions, and properties of a product through its development and useful life from business and engineering points of view. With regard to software in particular, lifecycle management corresponds to how a software vendor can control licensing and use of the software throughout its usable lifecycle. For example, vendors often install, uninstall, add features, provide patches, and/or provide updates to its software, add/remove computing capacity, change parameters, and properties with respect to performance and other characteristics important for operation of the product.

In general, the architecture 100 can support and perform tasks to increase the efficiency of a system. In some implementations, the lifecycle management architecture 100 represents a change management architecture that can be used to oversee changes within a particular system or network of systems. For example, the lifecycle management architecture 100 can be used at a service provider to group and assign similar tasks of several similar systems to one manager, or administrator, enabling the manager to automate the tasks. In general, the architecture 100 can operate to request tasks, plan tasks, prioritize tasks, manage tools, manage process implementations, evaluate system changes, and automate tasks and processes.

Tasks can be described by attributes or actions, which can be used to specify a specific role in a system. The role can, for example, be mapped to a group of administrators that can request execution of the tasks. Specific tasks can span a large variety of different design areas including, but not limited to, hardware, operating systems, databases, application servers, software applications, and/or software installations. In some implementations, the design areas can use the architecture 100 to automate tasks that are typically performed manually. In particular, the automation process used by the architecture 100 may ensure that manual tasks are addressable by a management infrastructure such that the tasks can be handled or assigned automatically without intervention from an administrator, for example.

With continued reference to FIG. 1, the architecture 100 may represent a change management system supporting multiple computer systems 102, 104, 106, 108, and 110 that are connectively coupled for communication with one another over a network 112. The computer systems 102-110 can be modeled as databases and/or server systems including a database, which abstract data from other functions throughout ERP (Enterprise Resource Planning) software installed on the systems. The computer systems 102-110 and network 112 may also have access to other various repositories. For example, the environment 100 may access a shared file system 114. The shared file system 114 may be a customer specific file system, a system rules file system, a procedures file system, or another category of file system. The shared file system 114 can store automation procedures, task data, tool data, and other management specific data.

System 100 can include a distributed client/server system that spans one or more networks such as network 112. In such cases, the various components—such as systems 102-110—may communicate via a virtual private network (VPN), Secure Shell (SSH) tunnel, or other secure network connection. Accordingly, rather than being delivered as packaged software, system 100 may represent a hosted solution that may scale cost-effectively and help drive faster adoption. In this case, portions of the hosted solution may be developed by a first entity, while other components are developed by a second entity. In such embodiments, data may be communicated or stored in an encrypted format using any standard or proprietary encryption algorithm. This encrypted communication may be between the user (or the application or client) and the host or amongst various components of the host. Put simply, communication or other transmission between any modules and/or components may include any encryption, export, translation or data massage, compression, and so forth as appropriate. Further, system 100 may store some data at a relatively central location (e.g., accessible over a WAN), while concurrently maintaining local data at the user's site for redundancy and to allow processing during downtime. But system 100 may be in a dedicated enterprise environment—across a local area network (over LAN) or subnet—or any other suitable environment without departing from the scope of the present disclosure.

The application servers 102 and 104 may represent servers that host one or more application program interfaces (APIs) to expose business logic or processes for use in third-party applications. The application servers 102 and 104 may provide services, hardware resources, and software framework to host services. In some implementations, the servers 102 and 104 can implement both server-based and client-based Web applications. For example, the application servers 102 and 104 can provide server applications (e.g., online services or portals) in an integrated development environment or in an external tool. In some implementations, the servers 102 and 104 can provide rules and procedures for automating manual activities.

The application servers 102 and 104 may host tools within the lifecycle management architecture 100. A tool represents a program that executes some task within a lifecycle management scenario. Tools can provide information for a task through a service. Tools can also notify another service about the demand for executing a task. Tasks may include identifiers defining operations that may be performed in an instance of a tool. In some implementations, tools can stop execution to request a manual task and then resume action after the manual task has been completed.

The client computer systems 106 and 108 may represent systems allowing tools and/or users to submit requests for performing tasks. In some implementations, the client systems 106 and 108 may represent external service providers who wish to process or request information in architecture 100. For example, the request may be a software upgrade request, a file request, a new user request, or other service request.

The administrator computer system 110 may represent systems enabling an administrator, such as an IT administrator, to enter rules, execute procedures, assign tasks, and/or assign identifiers to procedures. In some implementations, the administrator computer system 110 can monitor permissions for several tasks and tools within the architecture 100.

The techniques and components described herein may be implemented within an Enterprise Service Architecture (ESA) environment, often termed a Service Oriented Architecture (SOA). In certain implementations, SOA can be considered a blueprint for an adaptable, flexible, and open architecture for developing services-based, enterprise-scale business solutions. The respective enterprise service is typically a series of web services combined with business logic that can be accessed and used repeatedly to support a particular business process. Aggregating such web services into business-level enterprise services may provide a more meaningful foundation for the task of automating enterprise-scale business scenarios. The composite application framework comprises rules framework, design tools, methodologies, services and processes, an abstraction layer for objects, and user interface and process pattern libraries. The composite application framework supports model-driven application composition, so a user may build applications and/or implement supply chain policies with as little programming as possible, which often results in reduced development and deployment time for new/modified applications and business-pattern-oriented integration.

At a high level, the architecture 100 can organize manual activities as well as support efficient management and automation of the manual activities performed in customer systems and other hosted environments. Providing organization and automation of manual tasks can increase the efficiency in managing systems, procedures, and tasks. The techniques and components described herein may be used to reduce the operation costs for offerings based on "Software as a Service" (SaaS). Providing an SaaS offering can imply providing a large number of similar or even identical services to a very large group of users or customers. When offering SaaS, the provider will want to minimize costs to maximize profit. Within a hosted environment, where the components are operated providing the services to the customers, the processes to manage the components may occur very frequently in a similar fashion. A large number of similar or identical components (or instances of components) may be used to provide the offering to a large number of customers. In addition, the techniques described herein may offer a mechanism of managing similar actions which are required for the lifecycle processes of the components.

Manual tasks and activities related to implementation or change management may be responsible for a large part of overhead costs involved in maintaining hosted environments. In some implementations, the architecture 100 can reduce the costs by automating a number of manual actions and managing any remaining manual actions in an efficient manner. Automating manual activities can include automating by design, automating by specific automation module, or automating customer specific procedures. Within the development and usage lifecycle of a tool or procedure used by a service provider, the automation mechanisms refer to different lifecycle stages.

The "automation by design" targets the design phase of a tool or product. Here, the operation cost and level of automated operation are design criteria for the product. Whereas this approach is very efficient, it has a rather long period from the time changing the design to the usage at a service provider because the design may require changing or the new product may need to be created, tested, or shipped to the service provider for implementation. In the event that the vendor development organization is not taking requests from a hosting operator (e.g., because it is a product bought by the hosting operator, and he acts only as a customer to the vendor), it may not be possible to use this approach.

The "automation by specific automation module" targets both the development and implementation phase of the product. The tools and procedures provided by the vendor can include these automation modules. In addition, a hosting operator can add automation modules. This can result in a much shorter "time to market" and thus, may quickly decrease the operations cost.

The "automation by customer specific procedures" takes advantage of the specific implementation details at a hosting provider. By using the automation by customer specific procedures, further automation may be possible that may not otherwise be within reach of the vendor, since the implementation details may be markedly different.

In some implementations, the application servers 102 and 104 can automate manual tasks. For example, the automation can begin with the application server 102 automating a single system or task related to the system. Performing a single system automation or single task automation enables the administrator 110 to ensure that the manual action or task related to the system is addressable by the responsible teams. In some implementations, the automation can be performed at the architecture level. For example, manual tasks can be made addressable by the architecture 100 in a manner that the timely execution of actions related to one system is broken up such that similar tasks of several similar systems can be grouped and assigned to a single person or team. The architecture 100 can additionally assign execution and automation rights to the administrator 110 or a team responsible for the tasks.

In some implementations, the application servers 102 and 104 can collect a number of manual tasks into a pool organized by roles assigned to each task. The manual tasks can be available to the pool as a manual action with attributes (e.g., an identifier, a role, an affected tool system, a completion date, etc.). This may ensure that one team is responsible for a single type of manual action and accordingly, each team executes a number of similar types of tasks. In this fashion, the team can specialize on executing this particular type of task leading to an increase of knowledge related to the type of task. The teams responsible for a particular type of task can access the pool to receive a work list and organize the team's work to increase efficiency, for example.

In some implementations, the architecture 100 can employ a role-based model to automate and manage manual tasks. The role-based model may reduce the overhead of using an administrator by assigning teams to work on specific tasks that relate to each design area. For example, the application server 102 may be switched to a "business downtime" mode of operation. This mode may redirect a requested task to an appropriate role within the company. The redirection assigns the requested task to a team or individual who can provide a defined process for performing the task and in some examples, the team or individual can also perform the task. By way of one non-limiting example, the administrator 110 may provide a shipping label preparation task to a shipping department, which may retrieve a "shipping handling rule" and provide a "create shipping label page" to the requesting client. The client can then provide appropriate shipping information to the shipping department for processing.

In another example, the architecture 100 can assign a list of manual tasks to a particular role, such that when a user (e.g., client 108) accesses a resource related to a manual task, the user is mapped to the team responsible for the task. The user can work to automate the manual task and create an automation module that can perform the task automatically in the future. This can provide the advantage of allowing independent teams to manage their tasks independently and thus, the teams can increase efficiency by reducing communication overhead and the time to wait for other system users to finish a task.

In some implementations, the architecture 100 can define roles for specific design groups. For example, software tasks may be assigned to a software design group. The architecture 100 can use the defined roles and assign manual actions to each role, for example, by (i) defining a map with a particular manual task; (ii) automatically setting the role for all manual tasks arising from a process step (i.e., the smallest unit which can be executed by a tool); (iii) automatically setting the role for all manual actions arising from tools used by the system; and (iv) automatically setting a role for all manual tasks arising from an action to a certain entity within architecture 100.

Figure 2:
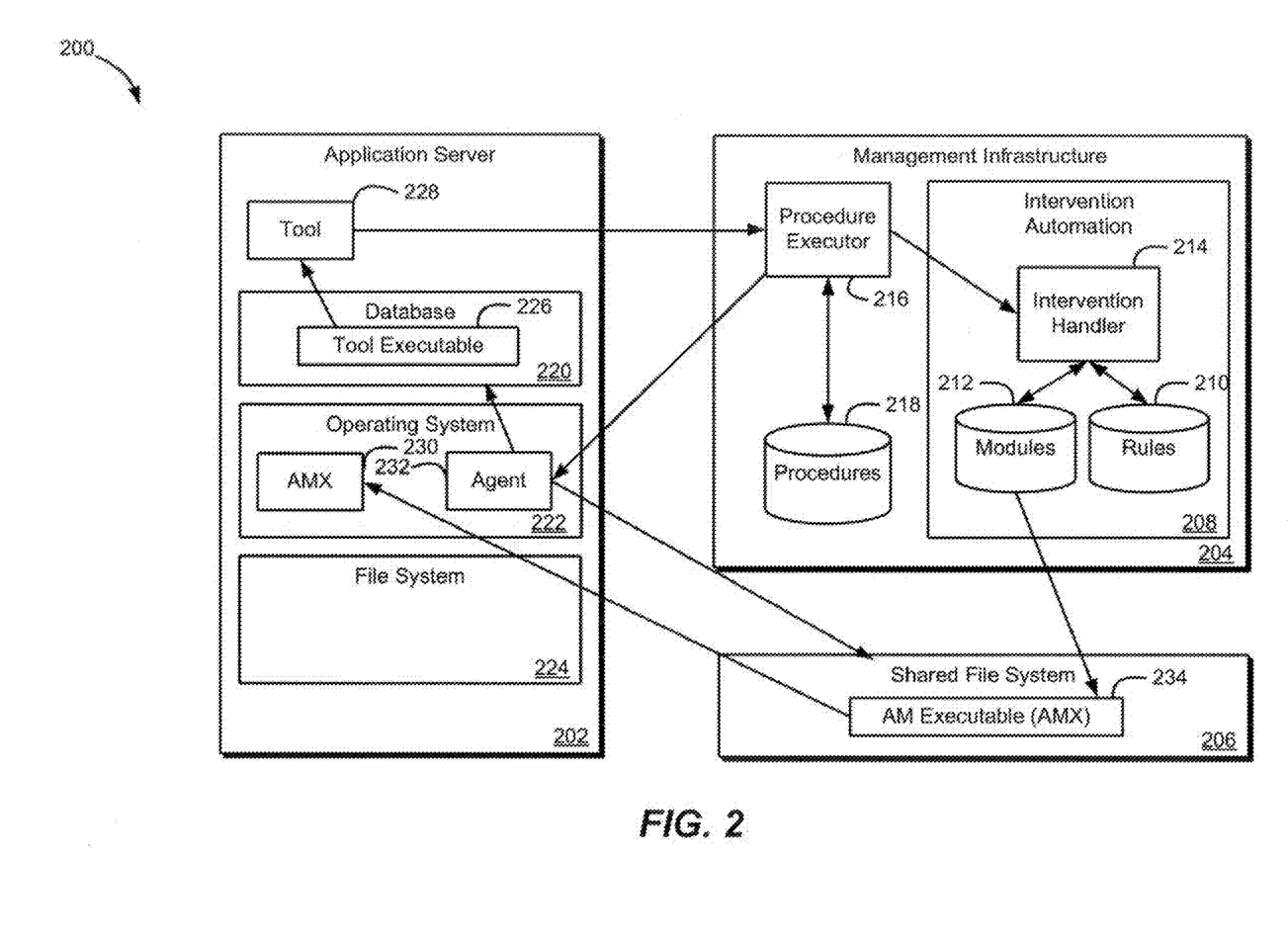
FIG. 2 is a block diagram of an automation infrastructure in accordance with the present disclosure.

FIG. 2 is a block diagram of an exemplar automation infrastructure 200 in accordance with implementations of the present disclosure. The automation infrastructure 200 represents a centralized infrastructure enabled to automate manual actions (e.g., tasks) using automation modules. In general, the infrastructure 200 can be used to increase the efficiency of service tasks and processes by implementing rules and handling architecture in a lifecycle management system. The rules can enable assigning, handling, and performing tasks in an automated manner. The handling architecture can provide a utility to handle error messages, user requests, route changes, tool changes, or other events occurring within architectures 100 or 200.

If a particular request for a manual action is provided in a structured format, such as XML or a similar format, the rules can identify the parameters and their values by the structure format. For example, the structured format may include XML code that selects a certain tag and extracts the tag attribute and values. The following pseudo-code is provided as an example of a structured format that may be provided in a request to select a tag and extract tag attributes and values:

```
<dialog>
    <identifier id="123" type="ERROR"/>
    <text>The file system $(file-system) is too small to allow execution of the following process. Extend file system $(file-system) by $(size) before continuing the procedure.</text>
    <parameter name="$(file-system)">/usr/sap/SID/</parameter>
    <parameter name="$(size)">12 GB</parameter>
</dialog>
```

In general, the tools accessed by the infrastructure 200 can generate and/or use one or more automation modules to automate and execute a manual task within a work list. For example, the infrastructure 200 can track a procedure to determine where manual tasks occur and where automation modules could be implemented to execute the manual tasks. In some implementations, the architecture 200 can access services to execute portions of a procedure which are automated. In some implementations, the services can execute the automated tasks and switch back to a manual mode to complete additional manual tasks.

Referring again to FIG. 2, the infrastructure 200 includes one or more application servers 202, a management infrastructure 204, and a shared file system 206. As discussed with respect to servers 102 and 104 described above, the application server 202 may represent a server that hosts one or more application program interfaces (APIs) to expose business logic or processes for use in third-party applications. The application server 202 may provide services, hardware resources, and software framework to host services. The application server 202 may host tools within the lifecycle management infrastructure 200.

The management infrastructure 204 may represent an entity that routes task requests within infrastructure 200. For example, the management infrastructure 204 may route a task request from a tool to an administrator's user interface. In another example, the management infrastructure 204 may route a task request from a tool to an intervention automation engine 208. The intervention automation engine 208 can receive manual task requests from the management infrastructure 204.

The management infrastructure 204 includes the intervention automation engine 208 that can retrieve and store automated modules and rules. The intervention automation engine 208 includes a rule database 210 pertaining to tasks generated and executed by infrastructure 200. The rule database 210 includes processing rules that may be defined by an administrator, such as the administrator 110 in FIG. 1, or can otherwise be provided as discussed herein. More specifically, and as discussed in further detail herein, one or more rules can be applied to a manual task request to extract relevant parameters from the manual task request, which parameters can be used to identify an automation module for automating the manual task. The rules can be specified for different task procedures, tools, and application servers. In some implementations, the rules may utilize a pattern matching technique to identify a particular tool output. For example, rules can be set up to search for a pattern within a dialog box (e.g., an error message "Error 123"). The rules may utilize pattern matching to find parameters pertaining to the manual task request, which parameters can be applied to determine one or more relevant automation modules, discussed in further detail below. For example, the rules may be used to extract one or more parameters from a particular manual task request, or string, received at the management infrastructure 204 from a tool (e.g., tool 228). By way of one non-limiting example, the string may include data requesting that more memory be added to a database (e.g., manual task request="Add 100MB to Database").

The intervention automation engine 208 extracts one or more parameters from the string, and matches the to one or more automation modules that can execute the manual task. The automation module can be deployed to the application server 202 to achieve the task. Using the memory increase example above, the automation module can be executed on the application server to increase the memory of the database by the requested amount. In some implementations, the rules may pertain to task preparation on a tool. That is, a rule may prohibit the performance of tasks on a tool until the tool has been prepared accordingly for the intended task.

In some implementations, the rules can be provided to the management infrastructure 204 using the manual task request itself. For example, the manual task request can include an embedded file (e.g., an XML file). The so-provided rules can be used to extract the parameters, and can be imported into the rule database 210. In some implementations, the rules can be specified for different application servers, procedures, and/or tools executing on the application servers. In this manner, the rules that are to be applied to extract the one or more parameters can be identified based on which application server, which procedure, and/or which tool.

In some implementations, the manual task request can include a tag specifying a particular role for executing the requested task. Such roles can include, but are not limited to, database, server, and infrastructure. The role can be used as a filter to limit the rules applied to the manual task request, and/or to limit the automation modules that can be implemented. In this manner, less than all of the rules in the rule database 210, and/or less than all of the automation modules can be reviewed to expedite automation of the manual task.

In some implementations, the manual task request can include an identifier (e.g., a global unique identifier) that specifies the automation module(s) to be implemented to achieve the manual task. In this manner, the parameter extraction process using the rules, and the automation module determination process using the parameters can be foregone. Such a case may occur in instances where a particular automation module has already been used to achieve a particular manual task, and the same manual task has arisen.

In some implementations, the infrastructure 200 can enable rules to assign tasks to one or more specialists. The specialists can create automation modules to perform specific tasks automatically. The specialists can store the automation modules in the infrastructure 200, and execute the automation module for a particular system or tool. In this fashion, the infrastructure 200 can use and reuse the automation modules to quickly and efficiently execute a requested task or work list.

The intervention automation engine 208 also includes automation modules 212, introduced briefly above. The automation modules 212 may represent programs that can automate manual tasks for internal needs or external needs at the application server 202. By way of one non-limiting example, the automation modules 212 may include a script that can extract, receive, and/or retrieve specific parameters such as a name of a file system or a size of a file system. Such an exemplar automation module can be used to extend the file system used in a task performed by the selected automation module 212, for example.

The intervention automation engine 208 also includes an intervention handler 214. The intervention handler 214 can store and retrieve both rules in the rules database 210, and modules in the automation modules database 212. In addition, the intervention handler 214 can execute procedures, if for example, the management infrastructure 204 requests execution of a particular automated procedure. In this example, the procedure executor module 214 may receive direction from a manual procedure executor module 216 located in the management infrastructure 204.

If the intervention handler 214 receives a request to perform a manual request, the intervention handler 214 uses the rules stored in rules database 210 to determine if an automation module exists in the modules database 212. If this is the case, the module is written to the shared file system 206 and the management infrastructure 204 is used to start the tool on application server 202 using the host agent 222. The intervention handler 214 checks the successful execution of the module. If the module is executed successfully, the procedure executor 216 is notified, and the request for a manual action is processed successfully. If the module is not executed successfully, for example, the request of the automation module sent to the management infrastructure 204 is an error message that is passed to the procedure executor 216, which presents this message to the administrator as a manual action.

In another implementation, a tool handler (not shown) can be included with the management infrastructure 204. The tool handler may be a re-use module that communicates with the tools in the system. The tool handler may be used by and communicate with both the procedure executor 216 and the intervention handler 214.

If a tool handler is included in the management infrastructure 204, the communication path may be modified accordingly. For example, the procedure executor module 216 can start the automation modules using the tool handler. If the intervention handler 214 receives a request to perform a manual request, the tool handler uses the rules stored in 210 to identify if an automation module exists in modules 212. If this is the case, the module is written to the shared file system 206 and the tool handler is used to start the tool on application server 202 using the host agent 222. The intervention handler 214 then checks the successful execution of the module using the tool handler. If the module executed successfully, the procedure executor 216 is notified, that the request for a manual action is processed successfully. If the module is not executed successfully, the request may be an error message that is sent to the tool handler. The error message is passed to the procedure executor 216, which presents this message to the administrator as a manual action.

The procedure executor 216 may receive a request to perform a procedure stored in a procedure database 218. Such a request can be generated by an administrator, for example, and can include, but is not limited to, a lifecycle management change procedure. For example, the administrator can issue a request to install, or update software that executes on the application server 202. The procedure can be retrieved from the procedure database 218, and can be initiated on the application server 202, as discussed in further detail below. In some instances, the procedure requires a manual task to be performed and issues a manual task request, such as that discussed above. The management infrastructure 204 passes the manual task indicated by the request to the intervention automation engine 208 using procedure executor 216. If the automation intervention engine 208 can execute an automation module to replace the request, it may do so and the management infrastructure 204 can continue with the next step. If the intervention automation engine 208 can not execute an automation module (e.g., no rule matches for the manual action request), the automation intervention engine 208 notifies the management infrastructure 204 (through procedure executor 216) to keep the manual action as such and present it to the administrator.

With continued reference to FIG. 2, the application server 202 includes a plurality of modules that can include, but are not limited to, a database module 220, an operating system module 222, and a file system module 224. The database module 220 includes tool executable 226 that can be used on particular tools 228 within the application server 202. The tool executable may represent a script or directions to perform a task, a procedure, a work list, or other process within application server 202. For example, in the case where an administrator initiates a procedure to be executed on the application server 202, a host agent can retrieve a tool executable 226 from the database 220, which tool executable 226 is instantiated as a tool 228 on the application server 202. The tool 228 executes to achieve the procedure initiated by the administrator. In this manner, the application server 202 can access one or more of a plurality of tools to perform a procedure initiated by the administrator.

The operating system module 222 can be used by services that execute operating system programs, scripts for databases, reports in an automation server, Java Enterprise Edition (JEE) applications, and/or other services. This service can be used by the management infrastructure 204 to execute automation module executables (AMX) 230, which embody the selected automation module(s) to achieve the manual tasks.

The operating system module 222 includes an agent 232. The agent 232 receives a request from the procedure executor 216 to perform a procedure on the application server 202. The agent 232 retrieves the tool executable 226, and instantiates the tool 228 to perform the requested procedure. In the event that a manual task request issues during performance of the procedure, and an automation module has been identified to achieve the manual task, as discussed above, the agent 232 retrieves an automation module executable 234 and instantiates the automation module on the application server 202 (e.g., automation module executable (AMX) 230).

The file system module 224 stores and organizes files and procedure data for the application server 202. In some implementations, the file system module 224 may include specific tool executable files accessible by internal and external parties. For example, the file system module 224 may be viewable and usable by another application server (not shown) in infrastructure 200.

The shared file system 206 stores and organizes files and procedure data for external parties and service providers, and is accessible by the application server 202 and the management infrastructure 204. The shared file system 206 includes one or more automation module executable(s) (AMXs) 234 that can be used by the application server 202 to perform one or more manual tasks that have been requested. For example, the shared file system 206 can receive an AMX 234 from the module database 212 after the appropriate automation module has been determined for the corresponding manual task.

In operation, the infrastructure 200 can automate manual tasks on the application server 202 if a request to perform a manual task on the application server 202 is received. In some implementations, the manual task request may be generated by the tool 228 or other component within the management infrastructure 204. In some implementations, the manual task request can be routed to an administrator computer. For example, the management infrastructure 204 can route the manual task request to a user interface in the intervention automation engine 208 via the procedure executor module 216.

Upon receiving a manual task request, the procedure executor 216 can access a procedure definition stored in the procedure database 218. The procedure definition can identify which tool corresponds to the received task request. The procedure executor 216 can use a remote access service to contact the agent 232 in the application server 202. This agent 232 can determine which shared file resources to access and which tool executable 220 to employ to complete the requested task.

As introduced above, the management infrastructure 204 can determine whether an automation module corresponds to the manual task request based on a received parameter (e.g., tool type, file size, service request, etc.) in the request. In some implementations, the intervention handler 214 can extract data from the request to (i) identify the system (e.g., tool) where the task should be performed or (ii) retrieve the parameters for the automation module. In some implementations, the management infrastructure 204 can provide the automation rules to at least one of an application server type, a tool type corresponding to a tool that is executed on the application server, or a procedure type corresponding to a procedure that can be executed on the application server 102.

As also introduced above, an automation module can be executed on the application server 202 to resolve a task corresponding to the manual task request. For example, the application server 202 may determine that a task can be performed by an automation module. The application server 202 can select the automation modules stored in the automation modules database 212 based on parameters extracted from the manual task request. Upon determining an appropriate automation module, the infrastructure 200 can provide the automation module to the application server 202. For example, the management infrastructure 204 can copy the identified automation module to the file share 206. Thus, the automation module is made available to be executed at the application server 202, where the manual action is to be performed.

Next, the agent 232 can be triggered to start the automation module using the received parameters. For example, the management infrastructure 204 can access a web service hosting the agent 232 to begin an executable or process on a tool. The agent 232 can then start the tool in the operating system module 222, engage the database module 220 for processing, or engage the application server 202 for processing. For example, the agent 232 can perform a request, such as upgrading a tool by upgrading a database, deploying an application, and running a process to migrate data.

If the automation module executes successfully, the original tool and procedure can be triggered to resume action on the current work list. In addition, the automation module can be archived in the shared file system 206 for future use by other tools and servers. In some implementations, the automation module can be stored in an intermediate computer-readable storage medium and accessed from the intermediate computer-readable storage medium for execution on the application server 202.

In some instances, an automation module may not be available for automating a particular manual task. In such cases, the requested manual task can be added to a manual work list. An administrator, or other personnel, can subsequently manually execute the task. For example, the manual task can be added to the task list based on role, and the personnel responsible for the particular role can manually execute the task.

In some implementations, the creation and execution of automation modules can ensure that administrator tasks are automated. For example, the infrastructure 200 can accept plug-in automation modules. In particular the plug-in modules can associate manual task requests to certain procedures executed by a specific tool. The tool can then provide exit points where the tasks can be inserted. The infrastructure 200 can use services to execute the automation modules using the plug-in modules. For example, the services can be used on the managed system (e.g., tool) to transfer the automation modules from a central managing infrastructure 204 to the tool.

The managing infrastructure can store automation modules, link automation modules to manual tasks, and launch automation modules remotely, as a "replacement" of a manual task. The replacement can occur by matching identifiers for specific tasks and tools. For example, if a tool reports a manual task with a particular identifier for a specific system, the managing infrastructure 204 executes the automation module matching the identifier, if an automation module exists.

In some implementations, the application server 202 may determine that an automation module corresponding to the manual action request does not exist within the database 212 based on the received parameters. In the event that the automation module does not exist, the server 202 can include the requested task in a manual task list and the task can be executed manually.

In some implementations, the application server 202 can initiate a procedure by an administrator computer and instantiate a tool on the application server 202 to perform an upgrade. The tool and procedures related to the tool may be executable by the application server 202. For example, a tool can exchange an executable and configuration file to upgrade to a new version of software. As such, the tool may receive a manual task with a tool executable 226. If the tool has the appropriate permission to upgrade the software, the upgrade can occur. If the tool does not have appropriate permission if, for example, an administrator had changed the permission for security reason, the manual task would be to change the permission in a way that the tool can exchange and use the tool executable 226. The tool can then stop, send a message to the management infrastructure 204 indicating that permission have to be changed to perform the task. The management infrastructure 204 can provide suitable permission by sending manual task information (e.g., permission information) to allow the tool to resume operation with the step that previously failed.

In some implementations, the tool can send information about a required task to a service. For example, the tool 228 can send an email to an administrator. The email may include an identifiable manual action and an instance of the tool running (which can be used in this example to specify a host where the tool is running). In the above example, the manual action may use operating system specialists that have appropriate permissions to execute the upgrade software task. Here, the role would be an administrator with operating system abilities and the access permission for the specified server.

In the example, the permission of a particular executable does not allow updating the executable by the corresponding tool 228. As such, the tool 228 reported a manual task request. The managing infrastructure 204 can receive a module changing the permission of the executable using a service to transfer a script to the requesting host agent 232. The service can start the script on the operating system 222 and change the permission of the executable 226. The tool can be called to repeat the task in an automated manner in the future.

Figure 3:
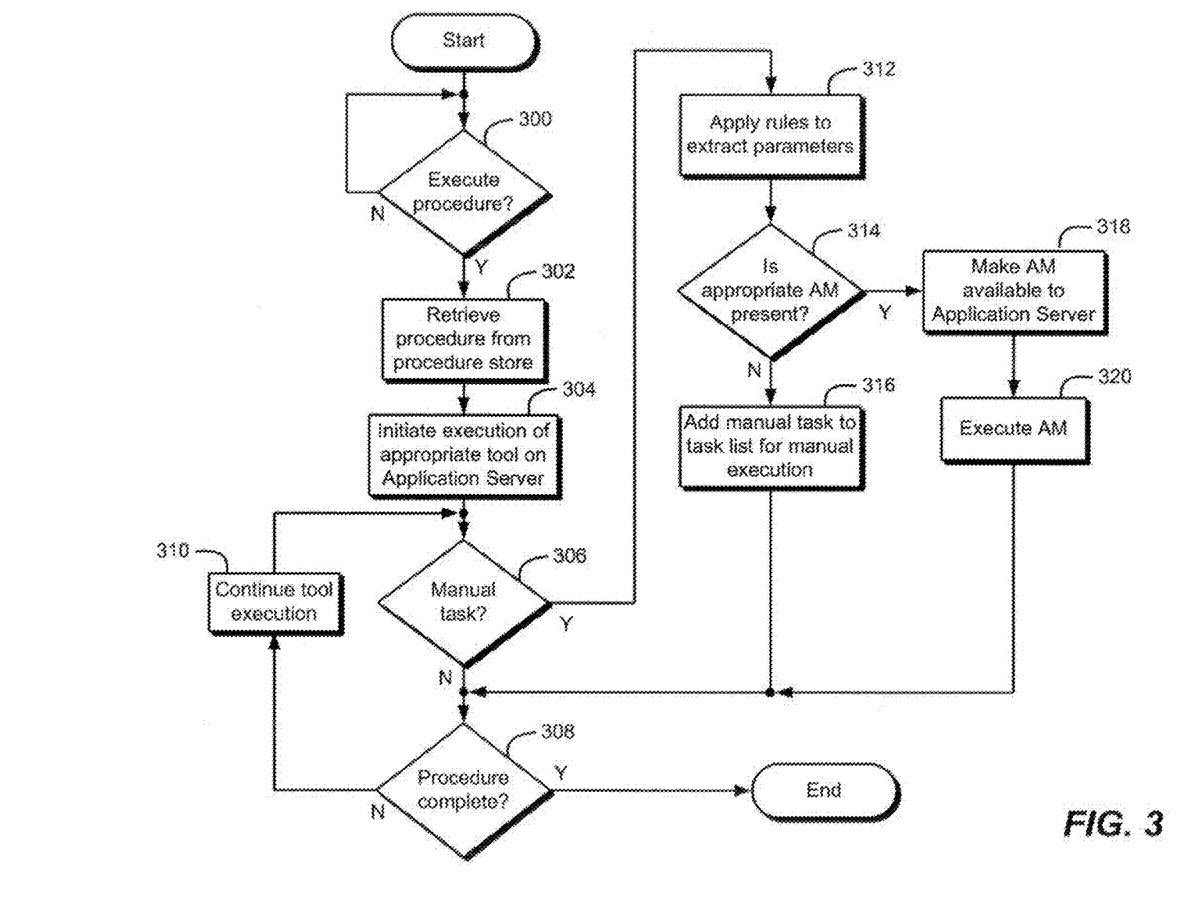
FIG. 3 is a flowchart illustrating exemplar steps that can be executed to automate a manual task in accordance with the present disclosure.

FIG. 3 is a flowchart illustrating exemplar steps that can be executed in accordance with the present disclosure. In particular, the steps can perform one or more tasks within a lifecycle management process. The process shown in FIG. 3 may be implemented using software instructions stored in a computer-readable storage medium and executed by a processing system including one or more processing apparatus. Briefly, the steps include retrieving procedures, rules, and tools to perform a task. The process also determines whether a particular task should be performed either manually or automatically. In some implementations, the process can be performed by an application server, such as application servers 102 or 202. In other implementations, the process can be performed by a management infrastructure, such as management infrastructure 204.

In step 300, the process determines if a request to execute procedure is received. Such procedures can include, but are not limited to, lifecycle management procedures for application servers, such as application installation and upgrading. If a procedure is not to be executed, the system operates normally and loops back. If a request to execute a procedure is received, the procedure is retrieved from the procedure store in step 302. For example, the procedure executor 216 can retrieve an appropriate procedure from the procedure database 218. In step 304, the process can initiate execution of a particular tool on an application server to perform the requested procedure. For example, the application server 202 can initiate execution of a tool 228.

To achieve the requested procedure, the execution of one or more tasks may be required, which tasks can include manual tasks (i.e., tasks that require human intervention to execute). In step 306, it is determined whether the received request pertains to a manual task. If the request does not pertain to a manual task, the system determines whether the procedure is complete, in step 308. The system performs the determination in step 308 to ensure that a particular tool continues to perform a remaining work list upon completing a particular task. For example, if an automated task were received, the process depicted in FIG. 3 can pause to perform the automated task and simply return to an unfinished work list upon completing the automated task, as shown in step 310. The tool may continue executing tasks and can periodically poll the application server 202 for new received tasks. If the procedure is the current work list or task ends, and the executing tool is released.

If, in step 306, it is determined that the received request is a manual task request, the process can apply rules to extract one or more parameters from the manual task request in step 312. For example, if a particular request includes using (i) a file system 234 and (ii) three gigabytes of memory, the application server 202 can apply corresponding rules for parameters (i) and (ii). The rules in this example may include increasing memory and using the particular data in the file system 234.

In step 314, it is determined whether an appropriate automation module is present in the system for the received manual task request. This determination is made based on the extracted parameter(s). If an automation module does not exist for the task, the process can add the manual task to a task list for manual execution. For example, the manual task can be added to a tool task list at the tool site. In some implementations, the manual task can be added to a graphical user interface on an administrator's system 110. Upon adding the manual task to either of the above task lists, the process can determine, in step 308, whether the procedure is complete, as discussed above.

If an appropriate automation module is present, the automation module is made available to the application server, in step 318. For example, the intervention automation engine 204 can provide the application server 202 access to the shared file system 206. In step 320, the process can execute the automated module to achieve the manual task. For example, the procedure executor 216 can execute the automated module on the tool 228. Upon executing the automation module tasks, the process can determine, in step 308, whether the procedure is complete, as discussed above.

Figure 4:
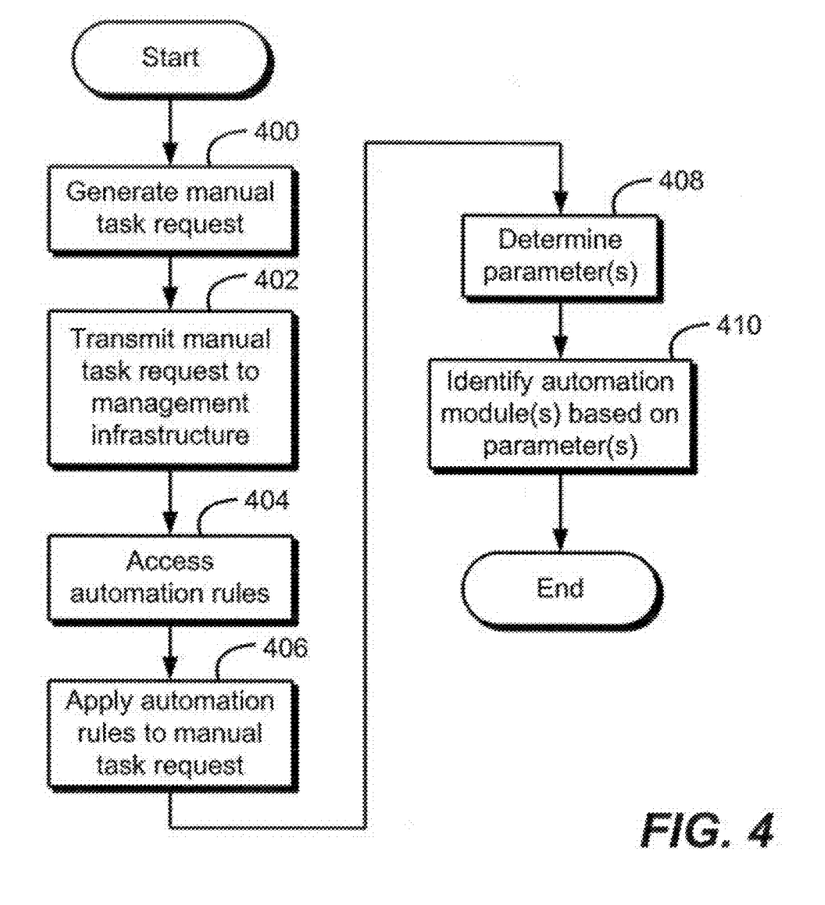
FIG. 4 is a flowchart illustrating exemplar steps that can be executed to determine an automation module in accordance with the present disclosure.

Referring now to FIG. 4, exemplar steps that can be executed to determine an automation module will be described. In step 400, a manual task request is generated. In step 402, the manual task request is transmitted to the management infrastructure. In step 404, one or more automation rules are accessed (e.g., from rules database 210). The automation rule(s) are applied to the manual task request in step 406. In step 408, the parameters are determine, or extracted, from the manual task request based on the automation rule(s). In step 410, one or more automation modules are identified based on the parameters. The identified automation modules can be subsequently implemented to automatically execute a manual task without human intervention, as discussed in detail above.

Figure 5:
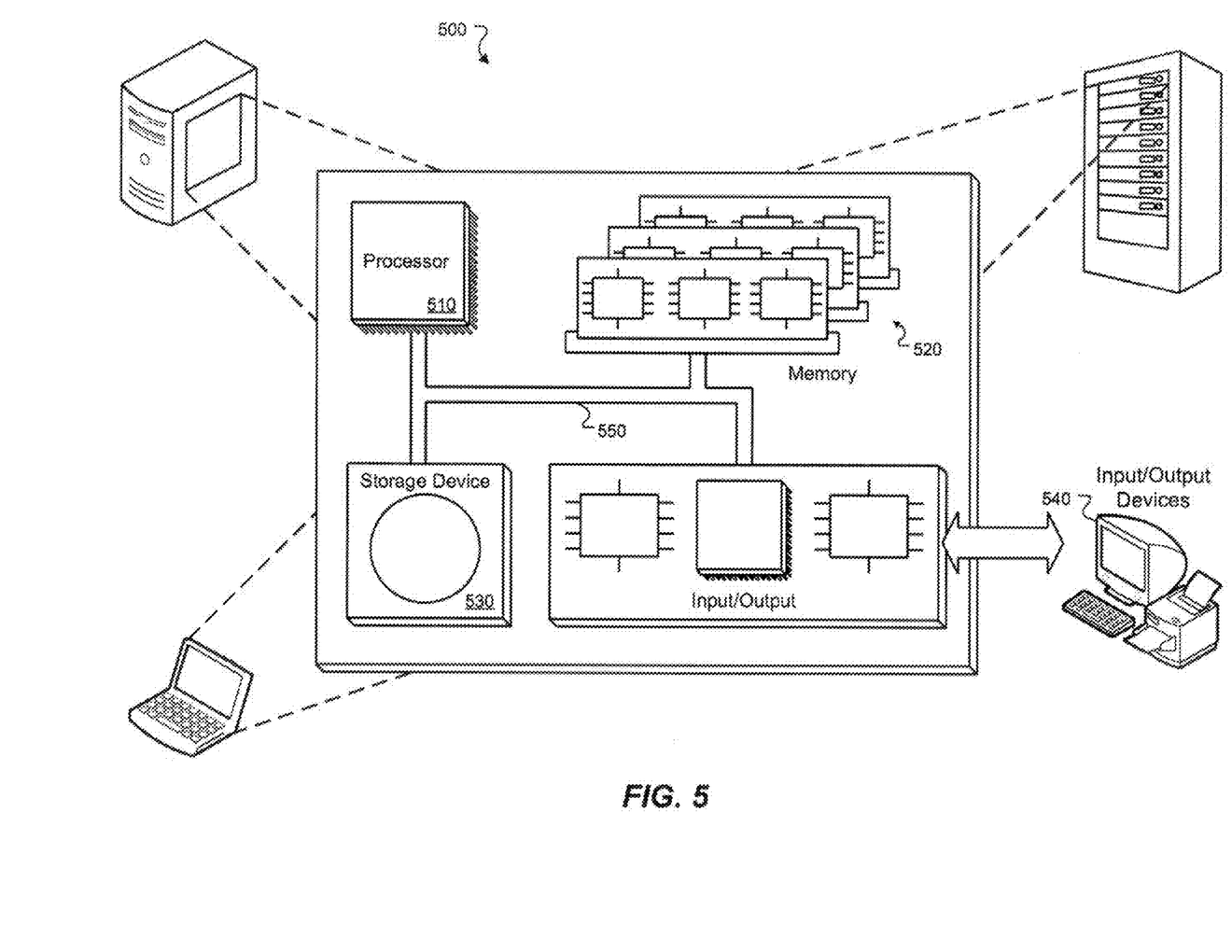
FIG. 5 is a schematic illustration of exemplar computer systems that can be used to execute implementations of the present disclosure.

Referring now to FIG. 5, a schematic diagram of an exemplar computer system 500 is provided. The system 500 can be used for the operations described in association with the methods described in FIGS. 3-4 according to one implementation. For example, the system 500 may be included in any or all of the servers 102, 104, 106, 108, or 110. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A method of automating manual tasks executed on an application server, comprising:
    executing a procedure on the application server, the procedure including a manual task;
    generating a manual action request at the application server, wherein:
        the manual action request includes at least one parameter,
        the manual action request corresponds to the manual task,
        the manual action request is associated with a role, the role being operable to filter at least one of automation rules that can be applied to the manual action request and automation modules that can be implemented to resolve the manual task, and
        the at least one parameter includes one of a tool type, a file size, and a service request;
    transmitting the manual action request from the application server to an administrator computer;
    determining that an automation module corresponding to the manual action request exists within a database based on the role and the at least one parameter, the automation module executable to resolve the manual task;
    transmitting the automation module to the application server for execution of the automation module on the application server; and
    executing the automation module on the application server to resolve the manual task corresponding to the manual action request.

2. The method of claim 1, further comprising:
    accessing the automation rules, the automation rules being stored in a rule database; and
    applying, based on the role, the automation rules to the manual action request to extract the at least one parameter.

3. The method of claim 2, further comprising providing the automation rules to at least one of an application server type, a tool type corresponding to a tool that is executed on the application server, and a procedure type corresponding to a procedure that is executed on the application server.

4. The method of claim 1, further comprising:
    initiating a procedure by the administrator computer; and
    instantiating a tool on the application server, the tool being executable by the application server to execute the procedure.

5. The method of claim 4, further comprising accessing a procedure definition stored in a procedure database, the procedure definition identifying the tool.

6. The method of claim 1, further comprising:
    determining that an automation module corresponding to the manual action request does not exist within the database based on the role and the at least one parameter; and
    updating a manual task list to include the manual task when determining that an automation module corresponding to the manual action request does not exist within the database.

7. The method of claim 1, further comprising:
    storing the automation module to an intermediate computer-readable storage medium; and
    accessing the automation module from the intermediate computer-readable storage medium for execution on the application server.

8. A non-transitory computer-readable storage medium coupled to one or more processors and having instructions stored thereon which, when executed by the one or more processors, cause the one or more processors to perform operations comprising:
   executing a procedure on the application server, the procedure including a manual task;
   generating a manual action request at the application server, wherein:
      the manual action request includes at least one parameter,
      the manual action request corresponds to the manual task,
      the manual action request is associated with a role, the role being operable to filter at least one of automation rules that can be applied to the manual action request and automation modules that can be implemented to resolve the manual task, and
      the at least one parameter includes one of a tool type, a file size, and a service request;
   transmitting the manual action request from the application server to an administrator computer;
   determining that an automation module corresponding to the manual action request exists within a database based on the role and the at least one parameter, the automation module executable to resolve the manual task;
   transmitting the automation module to the application server for execution of the automation module on the application server; and
   executing the automation module on the application server to resolve the manual task corresponding to the manual action request.

9. The non-transitory computer-readable storage medium of claim 8, wherein the operations further comprise:
   accessing the automation rules, the automation rules being stored in a rule database; and
   applying, based on the role, the automation rules to the manual action request to extract the at least one parameter.

10. The non-transitory computer-readable storage medium of claim 9, wherein the operations further comprise providing the automation rules to at least one of an application server type, a tool type corresponding to a tool that is executed on the application server, and a procedure type corresponding to a procedure that is executed on the application server.

11. The non-transitory computer-readable storage medium of claim 8, wherein the operations further comprise:
   initiating a procedure by the administrator computer; and
   instantiating a tool on the application server, the tool being executable by the application server to execute the procedure.

12. The non-transitory computer-readable storage medium of claim 11, wherein the operations further comprise accessing a procedure definition stored in a procedure database, the procedure definition identifying the tool.

13. The non-transitory computer-readable storage medium of claim 8, wherein the operations further comprise:
   determining that an automation module corresponding to the manual action request does not exist within the database based on the role and the at least one parameter; and
   updating a manual task list to include the manual task when determining that an automation module corresponding to the manual action request does not exist within the database.

14. The non-transitory computer-readable storage medium of claim 8, wherein the operations further comprise:
   storing the automation module to an intermediate computer-readable storage medium; and
   accessing the automation module from the intermediate computer-readable storage medium for execution on the application server.

15. A system for automating manual tasks executed on an application server, comprising:
   an administrator computer that communicates with the application server; and
   non-transitory computer-readable storage medium coupled to one or more processors and having instructions stored thereon which, when executed by the one or more processors, cause the one or more processors to perform operations comprising:
      executing a procedure on the application server, the procedure including a manual task;
      generating a manual action request at the application server, wherein:
         the manual action request includes at least one parameter,
         the manual action request corresponds to the manual task,
         the manual action request is associated with a role, the role being operable to filter at least one of automation rules that can be applied to the manual action request and automation modules that can be implemented to resolve the manual task, and
         the at least one parameter includes one of a tool type, a file size, and a service request;
      transmitting the manual action request from the application server to an administrator computer;
      determining that an automation module corresponding to the manual action request exists within a database based on the role and the at least one parameter, the automation module executable to resolve the manual task;
      transmitting the automation module to the application server for execution of the automation module on the application server; and
      executing the automation module on the application server to resolve the manual task corresponding to the manual action request.

16. The system of claim 15, wherein the operations further comprise:
   accessing the automation rules, the automation rules being stored in a rule database; and
   applying, based on the role, the automation rules to the manual action request to extract the at least one parameter.

17. The system of claim 16, wherein the operations further comprise providing the automation rules to at least one of an application server type, a tool type corresponding to a tool that is executed on the application server, and a procedure type corresponding to a procedure that can be executed on the application server.

18. The system of claim 15, wherein the operations further comprise:
   initiating a procedure by the administrator computer; and
   instantiating a tool on the application server, the tool being executable by the application server to execute the procedure.

19. The system of claim 18, wherein the operations further comprise accessing a procedure definition stored in a procedure database, the procedure definition identifying the tool.

20. The system of claim 15, wherein the operations further comprise:

determining that an automation module corresponding to the manual action request does not exist within the database based on the role and the at least one parameter; and updating a manual task list to include the manual task when determining that an automation module corresponding to the manual action request does not exist within the database.

21. The system of claim 15, wherein the operations further comprise:

storing the automation module to an intermediate computer-readable storage medium; and accessing the automation module from the intermediate computer-readable storage medium for execution on the application server.

* * * * *